Dec. 1, 1925.

J. GASSER

FLUID BRAKE

Filed Sept. 19, 1921

1,563,561

2 Sheets-Sheet 1

Joseph Gasser.
INVENTOR

BY Victor J. Evans
ATTORNEY

Dec. 1, 1925.

J. GASSER 1,563,561

FLUID BRAKE

Filed Sept. 19, 1921

2 Sheets-Sheet 2

Joseph Gasser.
INVENTOR

BY Victor J. Evans.
ATTORNEY

WITNESS:

Patented Dec. 1, 1925.

1,563,561

UNITED STATES PATENT OFFICE.

JOSEPH GASSER, OF TRENTON, NEW JERSEY; THERESA GASSER, ADMINISTRATRIX OF SAID JOSEPH GASSER, DECEASED, ASSIGNOR TO NEW JERSEY TWIN HOIST COMPANY, OF TRENTON, NEW JERSEY.

FLUID BRAKE.

Application filed September 19, 1921. Serial No. 501,536.

*To all whom it may concern:*

Be it known that I, JOSEPH GASSER, a citizen of the United States, residing at Trenton, in the county of Mercer and State of New Jersey, have invented new and useful Improvements in Fluid Brakes, of which the following is a specification.

This invention relates to brakes and more particularly to that type or form of brakes which are dependent upon or are moved into braking position by the action of a fluid under compression and it has for its primary object to provide a fluid brake for vehicles which when the vehicle is moving remains neutral or inoperative, but when a retarding effect is desired can instantly be brought into braking effect.

Another object of this invention is to provide a fluid brake for self-propelled vehicles characterized by the fact that as the degree of retardation increases there is a corresponding and consequential augmenting of the braking force.

A further object of my invention is to provide a novel brake structure that can be promptly and easily applied to motor propelled vehicles.

Still further this invention aims to provide a brake for vehicles which eliminates entirely all shoes, bands and analogous devices that are susceptible to easy derangement whereby their efficiency gradually decreases until they become appreciably ineffective.

With the foregoing and other objects in view which will become more apparent from the following description, my invention consists primarily in providing a closed-in fluid container or chamber that contains a piston which under normal conditions travels frictionless in the fluid, but instantly a retardation is applied creates a compressive force that effects a prompt braking or cessation of further motion on the part of the vehicle or other moving part to which it may be applied. The invention further consists in the novel features of construction, combinations and arrangements of parts hereinafter fully described and more specifically defined by the appended claim.

In the further disclosure of the invention reference is to be had to the accompanying sheets of explanatory drawings constituting a part of this specification, and in which like characters of reference designate the same or corresponding parts in all the views.

Figure 1:
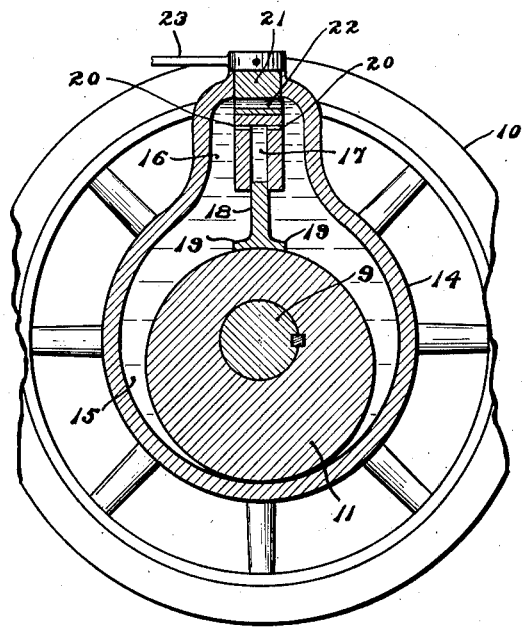

Figure 1—is a vertical section through one convenient construction of my improved fluid brake as adaptable for use on an automobile.

Figure 2:
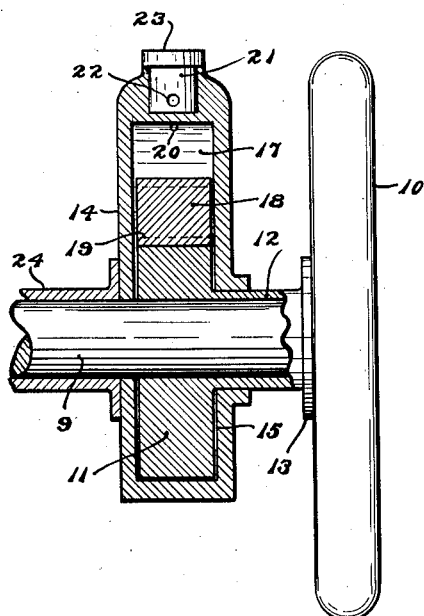

Figure 2—is a central vertical section taken at right angles to the preceding figure.

Figure 3:
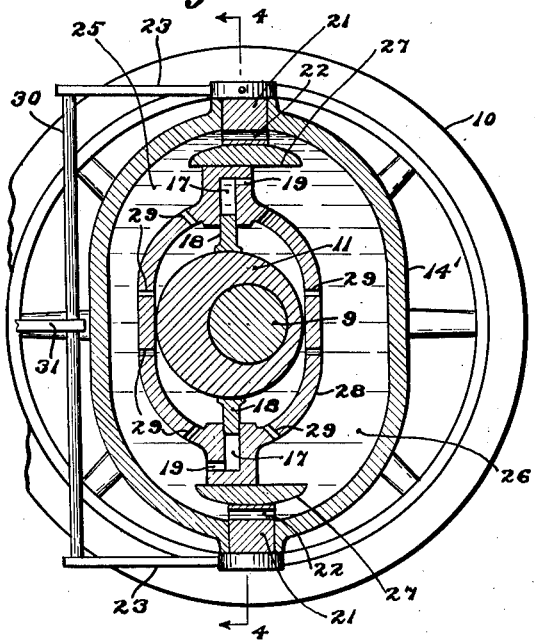

Figure 3—is a vertical section through a modified structure of fluid brake embodying the essentials of my invention.

Figure 4:
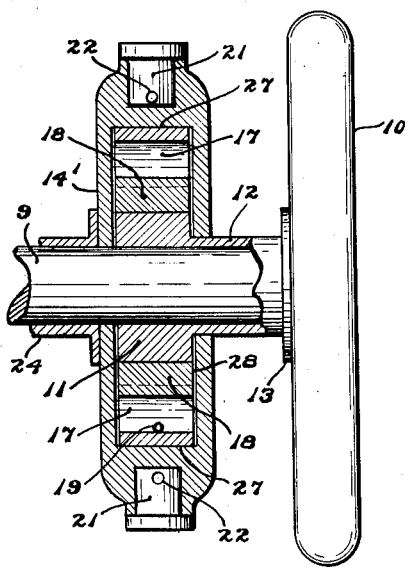

Figure 4—is a vertical section taken substantially on the line 4—4 in the preceding figure and looking to the left hand thereof.

Figure 5:
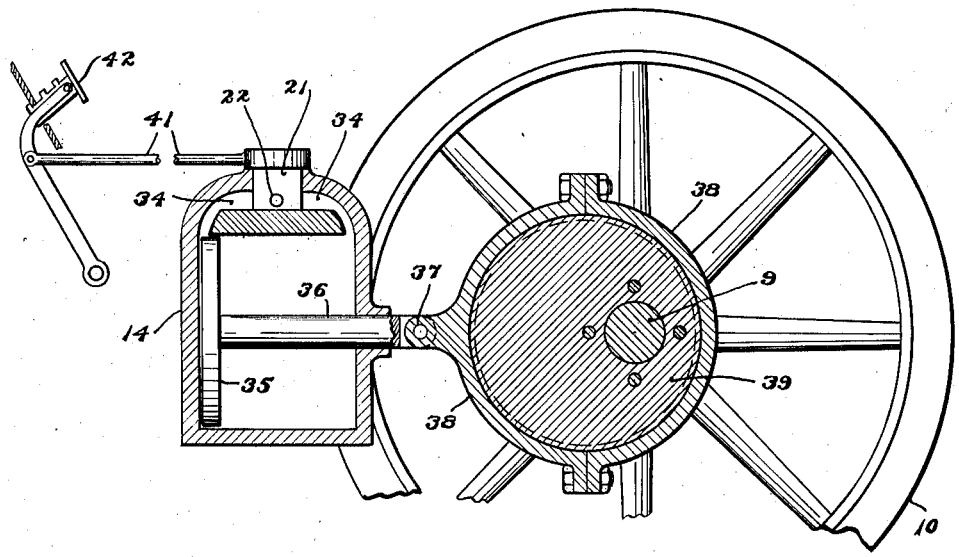

Figure 5—is a sectional view of a further modified form of the invention and illustrating a method of actuation from the ordinary service brake pedal.

Figure 6:
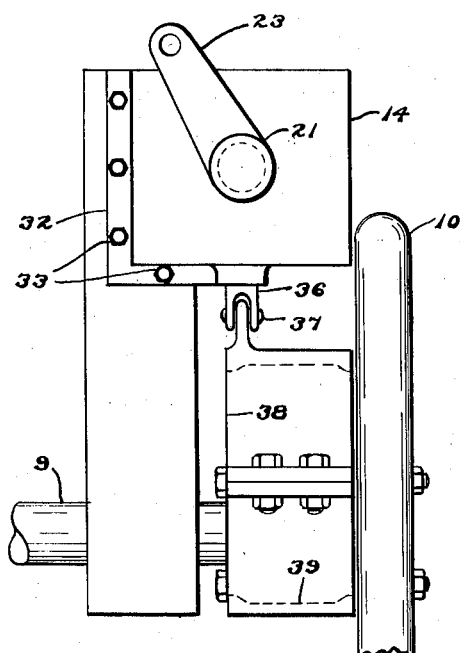

Figure 6—is a top plan view of the preceding figure.

Figure 7:
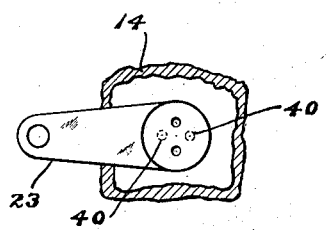
Figure 8:
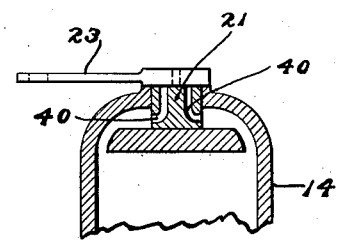

Figure 7—is a sectional plan detail of a valve control hereinafter more particularly referred to; and, Figure 8—is a vertical section through the showing of the preceding figure.

Referring more particularly to the views a fragmentary portion of an automobile rear axle is indicated by the numeral 9, and 10 designates one of the driving or rear wheels.

In the embodiment of the invention shown by Figures 1 and 2 more particularly, I secure on the axle 9 an excentric rotor 11 having a tubular part 12 that abuts the wheel hub 13. This excentric rotor 13 is housed with a working fit within a casing 14 pear-shaped in cross section as shown by Figure 1, thus providing a cylinder 15 and a valved piston chamber 16, in which is integrally formed a depending rectangular pocket 17 that houses the block piston 18 conveniently of inverted T-shaped cross section, that is to say, said piston is formed at its lower part with side flanges 19 to furnish a better seat upon the excentric rotor 11.

Bleed openings 20 are—or may be—provided at the upper part of the pocket 17 for the purpose later on explained, whilst there is fitted into the crown of the chamber 16 a plug cock or valve 21 having a transverse port or orifice 22 which normally provides a conduit or passage between both sides of the piston 18 and pocket 17. This plug cock or valve 21 is arranged for closure by means of a lever 23 as later on explained. It is to be here observed that the casing 14 is securely fixed to the shackle box 24 so that it cannot turn relative to the axle 9, or it may be otherwise anchored to accommodate different types of machines.

In the modified form of the invention shown by Figures 3 and 4, it is to be noted that the casing $14^1$ is made double-ended to provide two inter-communicating chambers 25, 26, baffles or division parts 27 at the upper and lower parts serving as guides between which a hollow slidable member 28 can be reciprocated, said hollow slidable member 28 being of a corresponding—but considerably smaller—shape in cross section to that of the casing $14^1$, and it houses the excentric rotor 11 whereby it can be moved to and fro between said guides 27 as later on explained. This hollow slidable member 28 is also formed with upper and lower inwardly directed rectangular pockets 17 in which operate block pistons 18 as above set forth in reference to Figures 1 and 2 whereas opposedly directed bleed openings 20 connect the pockets 17 with the opposed chambers 25 and 26. Ports or holes 29 are also provided at desirable points about the hollow slidable member 28, whereby the parts are frictionless balanced under normal service conditions. A plug cock or valve 21 is fitted into the upper and lower end of the casing $14^1$ and the operating levers 23 thereof are connected by a rod 30 under the action of a control 31 whereby said cocks or valves 21 are simultaneously caused to be closed and opened as later explained.

Referring now more particularly to Figures 5 and 6 it will be readily seen that the chamber or casing $14^1$ is of somewhat different formation, that is to say, it is essentially cylindric and adapted for attachment to the shackle box 24 by flanges 32 and bolts 33 in the well known way. On the upper part of the cylinder 15 is a sort of valve chest having ports 34 connecting with each end of the said cylinder, the plug cock or valve 21 being mounted vertically therein, as before explained. The piston 35 is of the ordinary type and the rod 36 thereof is outwardly extended through a suitable gland and hingedly connected at 37 to the strap 38 of an excentric 39 securely fixed on the axle 9 as hereinbefore explained. This constructional form of my invention lends itself very effectively to the employment of air as the braking medium and it will be observed that the plug cock or valve 21 is preferably formed with upwardly directed ports 40— Figures 7 and 8—which are normally open but which when closed will cause a compression of the air on one side of the piston with an appreciable suction on the other, whereby a very efficient brake is ensured.

A convenient means is indicated in connection with Figure 5 for operating either of the forms of the invention illustrated and it briefly comprises a link or rod 41 connecting from the lever 23 to the ordinary service pedal 42, the use and actuation being too well known to necessitate further explanation.

In operation it will be readily seen that when a liquid is used such as oil to fill the casing 14 or $14^1$—as shown by Figures 1 to 4 inclusive—that under normal conditions the plug cock or valve 21 will be open permitting the oil to flow freely through from side to side of the pistons 18 as the excentric rotor 11 is rotated. Immediately the brake or brakes is or are to be applied the plug cock or valve 21 is slowly closed whereupon it will be perfectly obvious that the oil will be backed up in a contra-clockwise or left-hand direction with an ever increasing retarding pressure. On the other hand if the plug cock or valve 21 is sharply closed the effect will be a powerful application of braking pressure, such as will meet the needs of any emergency. Where air is used as explained in connection with Figures 5 to 8 inclusive, it will be clearly apparent that a compression will be effected on one side of the piston 35, and a consequential suction on the other, both of which will result in a powerful retarding and braking pressure being exerted on the excentric 31.

From the foregoing it will be clearly seen that by my invention there is provided an exceedingly effective and very simple brake readily usable for either ordinary service or emergency purposes when applied to self-propelled vehicles, and whilst there has been shown and described practical embodiments thereof, the same are not to be construed as conclusive as structural changes and variations will be obvious without departing from the essential features thereof; the right is therefore hereby reserved to make such changes and other modifications as fairly lie within the scope of the appended claim.

Having described my invention, what I claim as new and desire to secure by Letters Patent is:

In a brake mechanism, the combination with an axle, an eccentric mounted thereon, a casing surrounding said eccentric and enclosing it, said casing having an extension forming a valve chamber, a partition extending into said valve chamber, and provided with a pocket therein, a piston operable by said eccentric and movable in said pocket, and a valve associated with said valve chamber.

In testimony whereof I affix my signature.

JOSEPH GASSER.